United States Patent [19] [11] 4,079,196
Spanel [45] Mar. 14, 1978

[54] TELEPHONE CONTROL APPARATUS

[76] Inventor: Abram Nathaniel Spanel, 344 Stockton St., Princeton, N.J. 08540

[21] Appl. No.: 667,335

[22] Filed: Mar. 16, 1976

[51] Int. Cl.² .............................................. H04M 1/08
[52] U.S. Cl. .................................................. 179/1 HS
[58] Field of Search ................... 179/1 HS, 1 C, 2 C, 179/1 HF, 81 B, 101 L, 161–165

[56] References Cited

U.S. PATENT DOCUMENTS

| | | | |
|---|---|---|---|
| 2,731,522 | 1/1956 | Anklesaria | 179/178 |
| 3,156,771 | 11/1964 | Vaughn | 179/1 HS |
| 3,226,491 | 12/1965 | Spangler | 179/161 |
| 3,319,003 | 5/1967 | Prager | 179/1 HS |
| 3,384,720 | 5/1968 | Beatty | 179/1 HS |
| 3,662,109 | 5/1972 | Beatham | 179/1 HS |
| 3,730,996 | 5/1973 | Iwasaki | 179/1 HS |

Primary Examiner—Thomas W. Brown
Assistant Examiner—Gerald L. Brigance
Attorney, Agent, or Firm—J. Rodman Steele, Jr.

[57] ABSTRACT

A telephone control apparatus is disclosed for controlling the use of a telephone in which the handset of the telephone may be continuously located at position remote from the telephone for use with auxilliary equipment, such as a hands free telephone unit or a data telephone adapter. Manually operable means are provided for selectively holding the disconnect switch buttons in the telephone cradle in either a depressed or a released condition. The manually operable means is provided with switch means whereby the auxilliary equipment or device may be actuated upon release of the disconnect switch buttons and deactuated when the manual means depresses the disconnect switch buttons of the telephone. In this manner, the handset of the telephone may be located at a position remote from the telephone handset cradle, while the telephone control apparatus provides means whereby the telephone may be conveniently controlled to initiate or receive telephone communications, or end them.

12 Claims, 6 Drawing Figures

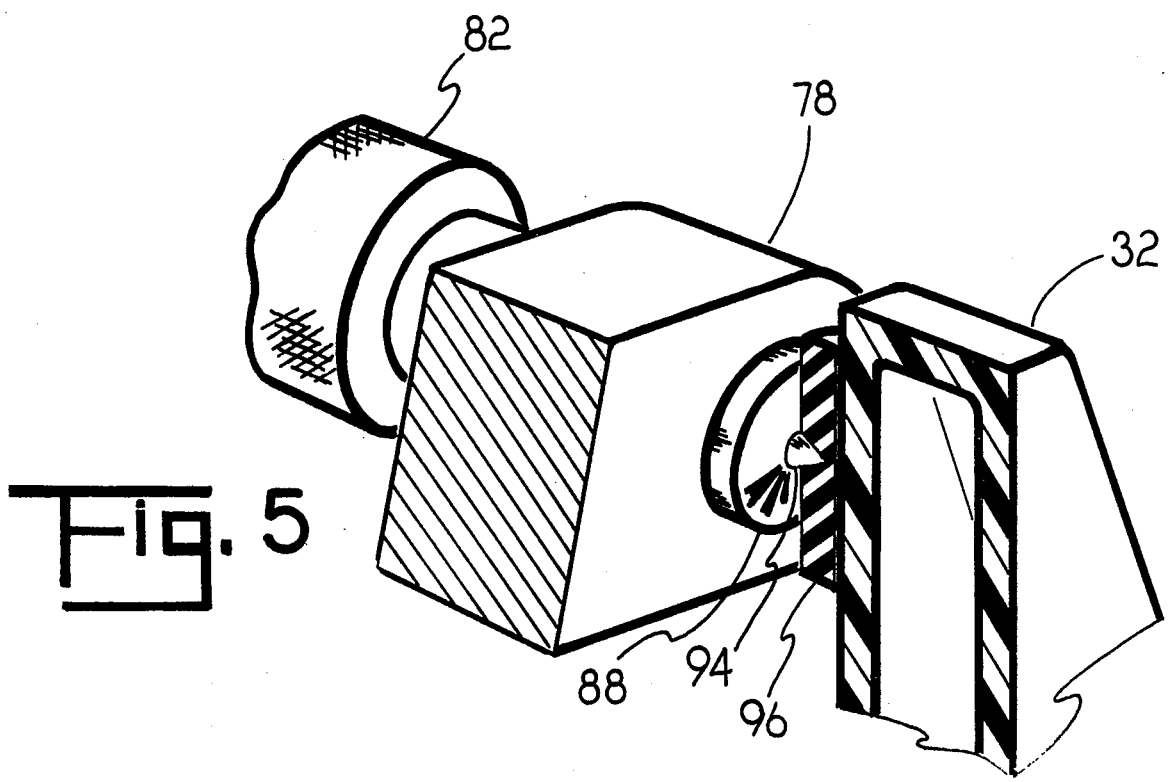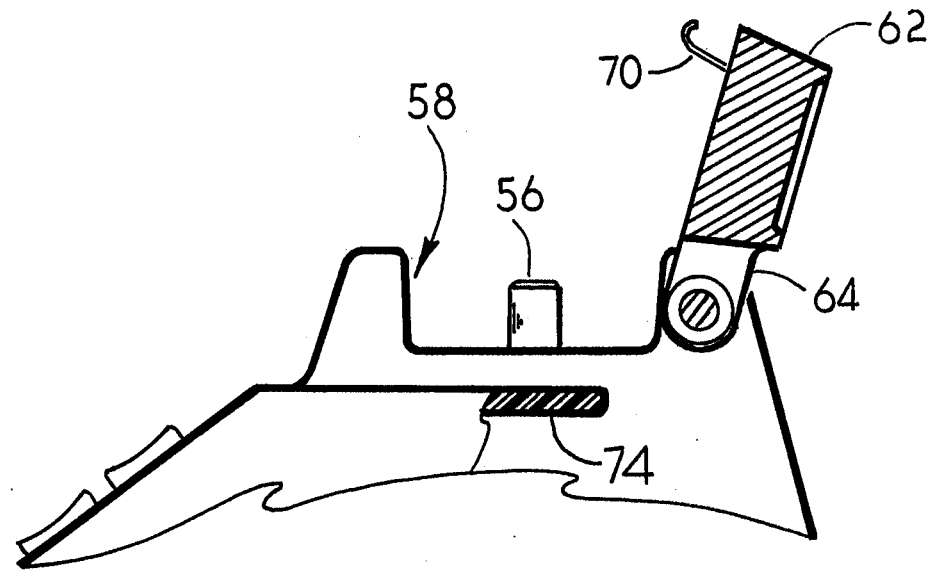

TELEPHONE CONTROL APPARATUS

BACKGROUND OF THE INVENTION

The present invention relates to telephone control apparatus.

More particularly, the subject invention relates to telephone control apparatus in which the handset of a telephone may be located continually at a location remote from the telephone and in association with auxilliary devices or equipment. The subject invention enables the initiation and receipt of telephone communications even though the handset is positioned at a remote location. Similarly to end such communications.

Auxilliary devices and equipment for use with telephones are known in the art. For example, U.S. Pat. No. 3,887,771 — Abram N. Spanel discloses a telephone adapter which may be used to enhance the quality and ease of communication by telephone. The aforementioned patent of Abram N. Spanel enhances the quality of communication in both directions and furthermore, frees the speaker from holding the handset thus enabling the speaker's free movement during the telephone conversation. Other types of auxilliary equipment for use with telephones are also known, such as for example, adapters which are used to transmit and receive digital information and other data over telephone lines.

SUMMARY OF THE INVENTION

An advantage of the subject invention is that it provides a convenient means of manually controlling a telephone to enable initiation and receipt of telephone communications in a telephone system where the handset of the telephone may be located continually at a remote location in connection with auxilliary equipment or devices. Thus, the subject invention tremendously increases the convenience to the user of telephone systems which utilize auxilliary equipment in connection with the handset of the conventional telephone, even to end communications.

Additionally, the subject invention is inexpensive to manufacture and it can be readily mounted on most conventional desk telephones. In so doing, there is no need to modify the structure of the telephone nor will the telephone be damaged in any manner.

Another advantage of the subject invention is that it is relatively simple in structure and highly reliable in extended use.

Briefly, in accordance with the subject invention, telephone apparatus is provided for enabling the use of the telephone in a manner where the handset is used in conjunction with an auxilliary device. Manually operable means is provided for selectively depressing or releasing the disconnect switch button in the telephone cradle. This manually operable means is provided with switch means whereby an auxilliary device may be actuated upon release of the disconnect switch button and deactuated when said manually operable means depresses the disconnect switch buttons of the telephone. In this manner the handset of the telephone may be continuously located at a position remote from the telephone handset cradle and may be placed continuously in an operative position with the auxilliary device.

In the subject invention, the manually operable means comprises a member pivotally mounted on the telephone. The member is constructed of a predetermined weight sufficient to depress the disconnect switch buttons. The member is adjustable to a first position to engage the disconnect switch buttons of the telephone in order to depress them and adjustable to a second position in order to release the disconnect switch buttons.

BRIEF DESCRIPTION OF THE DRAWINGS

For the purpose of illustrating the invention, there are shown in drawings, embodiments of the invention which are presently preferred; it being understood, however, that this invention is not limited to the precise arrangements and instrumentalities shown.

FIG. 5 is a partial cross sectional view of the attachment of a slightly modified pivot support means to the telephone cradle projections.

FIG. 6 is a view, partially in cross section, of the embodiment of the subject invention shown in FIGS. 1 through 4 with the disconnect switch buttons of the telephone in the release position.

DETAILED DESCRIPTION OF THE PREFERRED EMBODIMENTS

Figure 1:
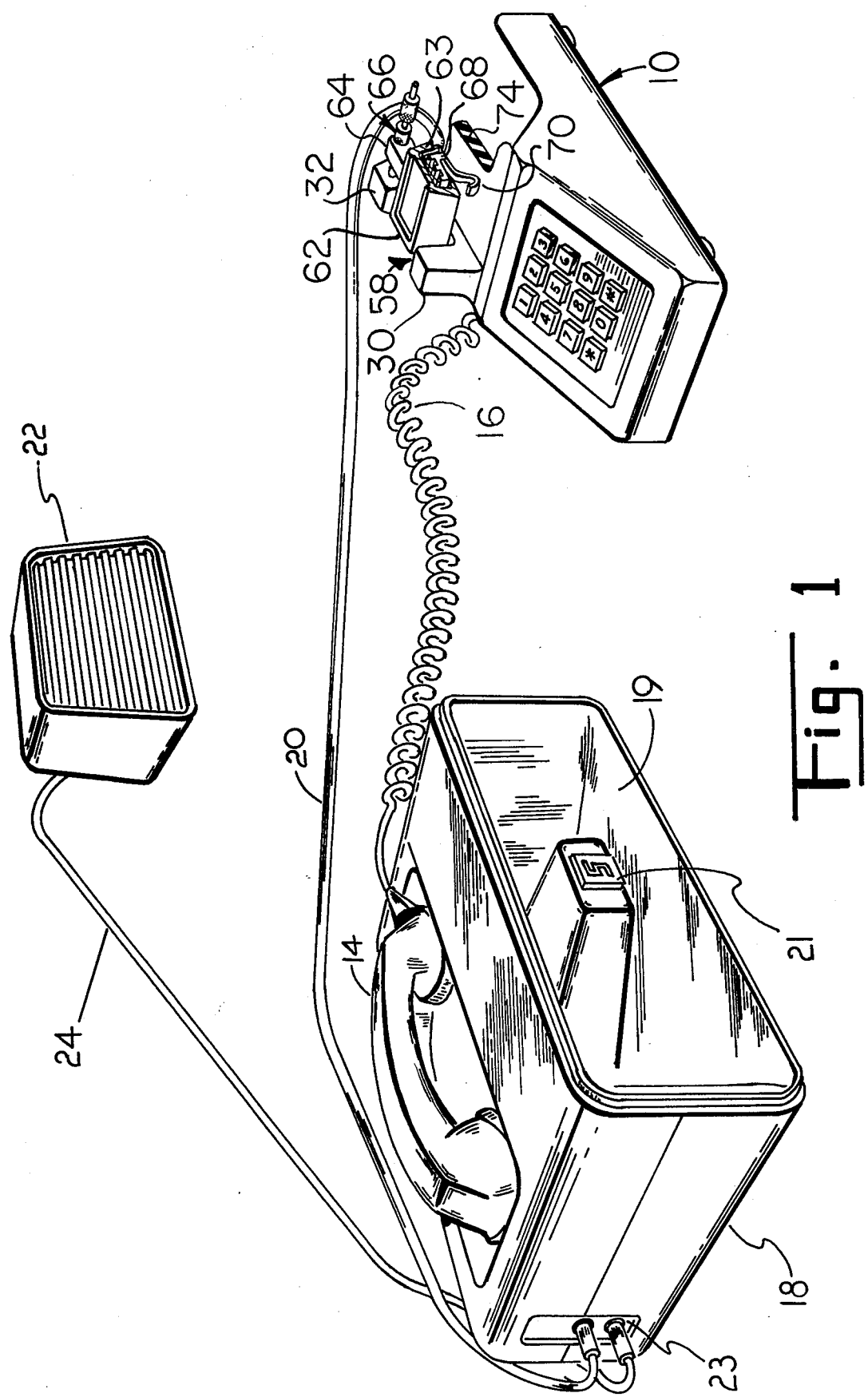
FIG. 1 is a perspective view of a telephone control apparatus being utilized in conjunction with auxilliary equipment in the form of a telephone adapter in accordance with the principles of the subject invention.

With reference now to the drawings in detail, wherein like numerals indicate like elements, there is shown in FIG. 1 a telephone 10 which is provided with a telephone control apparatus 62. The telephone handset 14 is connected to the telephone 10 in a conventional manner by means of a telephone handset cord 16. The telephone handset may be continually located away from the cradle of the telephone in conjunction with auxilliary equipment 18. Auxilliary equipment or device 18 may be a telephone adapter which provides high accoustic amplification for sound to be transmitted over the telephone and may be similar to that described in the aforementioned U.S. Pat. No. 3,887,771 of Abram N. Spanel. However, the telephone handset 14 may be used in conjunction with any other type of telephone auxilliary equipment; including adapters or converters used for transmission of digital data. It is sufficient for the purposes of this invention to note that such data transmission auxilliary devices which enable the transmission of signals corresponding to numbers generated by operation of a telephone dial means are well known and need not be described herein.

The standard desk telephone includes a cradle 58 which comprises a structure on each side of the upper portion of the telephone. Each of these structures is comprised of a front projection member 30 and a rear projection member 32 with a lower support surface 33 extending therebetween. The disconnect switch buttons 56 project through this surface 33.

The telephone adapter shown in FIG. 1 is provided with an open mouth 19 of an exponential reentrant horn and an elapsed time display 21 located in the center thereof. The elapsed time display 21 indicates the elapsed time beginning with the commencement of the telephone communication. The telephone adapter 18 is provided with an input connection board or terminal board 23 through which are connected speaker cable 24 making connection with speaker 22 and control cable 20 carrying the actuating or enabling signal from telephone control apparatus 62. Connection board 23 may also serve as the input for a-c power to telephone adapter 18 or such a-c power input may be provided at the rear of the telephone adapter 18. Such a-c power input is not illustrated in the drawings as it is conventional, however, it is to be understood that the telephone adapter does include certain electrically powered electronic components. D-C power may of course be used.

Figure 2:
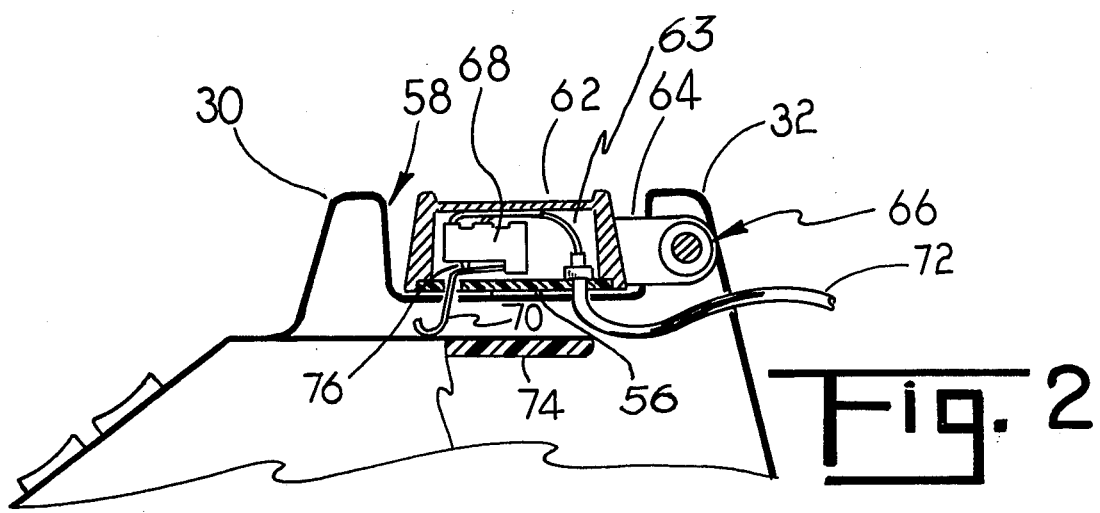
FIG. 2 is another view in cross section of the embodiment of the subject invention shown in FIG. 1.

With further reference to FIG. 1 and FIGS. 2 through 6, a member 62 of a predetermined weight is pivotally mounted by means of pivot arms 64 and 78 (see FIG. 3) and pivot support means 66 in order to hold the telephone disconnect switch buttons 56 in a depressed condition when member 62 is in the cradle 58 of the telephone as shown in FIGS. 1 and 2. Member 62 is of a predetermined weight sufficient to hold down the disconnect switch buttons 56 and may be a substantially solid mass of material with a cavity 63 for receiving a switch assembly 68 having a switch actuation arm 70. Member 62 may be comprised of lead, steel or another other suitable material. Member 62 may be coated with another metal to enhance its appearance or it may be provided with a covering of a synthetic resin material or other coating substance. Switch assembly 68 is connected to the auxilliary device or equipment by means of control cable 72. With member 62 in the position as shown in FIGS. 1 and 2, switch actuation arm 70 is in contact with the top of the telephone casing projection handle 74 which causes the deenergization or deactivation of the auxilliary equipment. When member 62 is raised, switch actuation arm 70 is released and switch 68 causes actuation of the auxilliary equipment or device.

Figure 3:
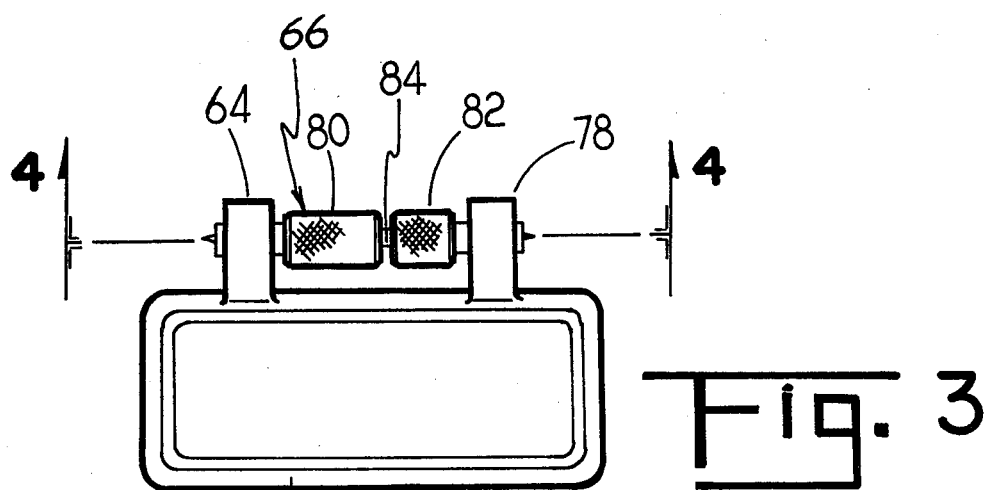
FIG. 3 is a plan view of the embodiment of the subject invention shown in FIGS. 1 and 2.
Figure 4:
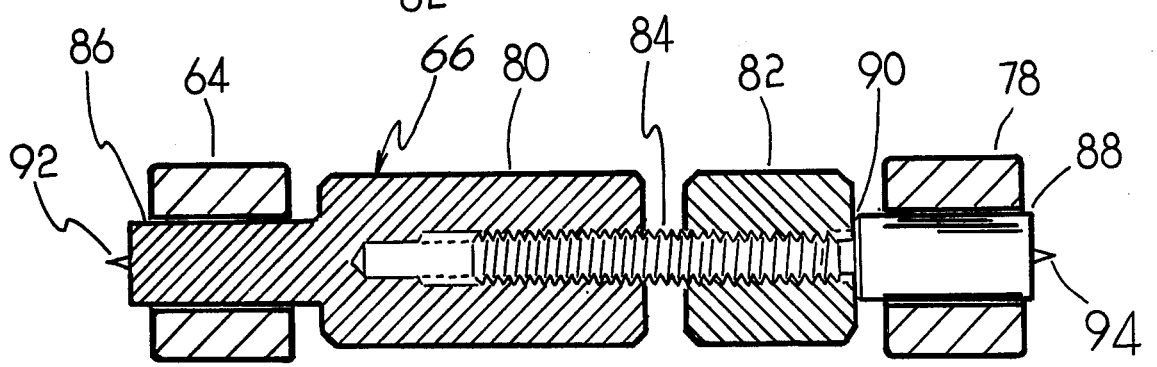
FIG. 4 is a cross sectional view taken along line 4—4 of FIG. 3.

The pivotal support means 66 is longitudinally adjustable to mount between the rear projections 32 of the telephone cradle 58. With particular reference to FIGS. 3 through 5, it may be seen that the adjustable length pivotal support means 66 is comprised of a first and second members 80 and 82, respectively which have internally threaded bores. A threaded adjusting shaft 84 is threadably mounted through the internally threaded bores of members 80 and 82. Member 80 is provided with a hinge pivot or bearing surface 86 upon which the bearing surface of the bore of pivot arm 64 is mounted. Threaded shaft 84 is provided with a hinge pivot or bearing surface 88 which may be integrally formed on shaft 84. The bore surface of arm 78 rides on the bearing surface 88. The length of adjustable pivotal support means 66 may be adjusted by advancing or retracting threaded shaft 84 in member 80. This may be performed by locking member 82 with respect to the inside surface 90 of bearing means 88. The outer end surfaces of bearing means 86 and 88 are provided with pointed elements 92 and 94, respectively, directed along the longitudinal axis of adjustable support means 66.

In order to avoid even the smallest possible marring of the telephone, a pad 96 may be provided between the outside end of hinge pivot 88 and the inside surface of the rear projections 32 of the cradle of the telephone. The pad 96 may be preferably comprised of polyurethane and have an adhesive surface for bearing against projections 32. However, it is to be understood that pads of other suitable material may be used. It is to be understood that the pad 96 would be provided at the outside ends of both hinge pivot members 86 and 88.

With reference now to FIG. 6, the embodiment of FIGS. 1 and 2 is shown wherein, however, member 62 is in the raised position. With member 62 in the raised position as shown in FIG. 6, the contacts in switch assembly 68 may be closed thereby activating the auxilliary equipment. Member 62 is raised when it is desired to receive or initiate a telephone communication. The raising of member 62 releases the disconnect switch buttons 56 thereby allowing communication via telephone.

The present invention may be embodied in other specific forms without departing from the spirit or essential attributes thereof, and, accordingly, reference should be made to the appended claims rather than to the foregoing specification as indicating the scope of the invention.

I claim:

1. Telephone apparatus for enabling use of a telephone having a handset positionable upon disconnect switch buttons between projection structure of a telephone cradle, said handset to be used with an auxilliary device, said projection structure comprising individual projection members which position said handset, said telephone apparatus comprising:
   operable means for selectively depressing or releasing at least one of the disconnect switch buttons on the telephone cradle when the handset is removed from the telephone cradle, said operable means extending between individual projection members of said telephone cradle comprising a member pivotally mounted therebetween, said member providing a predetermined force sufficient to depress said at least one disconnect switch button, said member being adjustable to a first position to engage one of said disconnect switch buttons of said telephone thereby depressing the same and adjustable to a second position to release said one disconnect switch button; and
   switch means whereby said auxilliary device may be actuated upon release of one of said disconnect switch buttons and deactuated when said operable means depresses said one disconnect switch button of said telephone whereby said handset of said telephone may be continuously located with said auxilliary device at a position remote from the telephone handset cradle.

2. Telephone apparatus in accordance with claim 1, wherein said member is provided with pivotal support means, said pivotal support means including a longitudinally adjustable shaft mounted between the inside surfaces of opposed sides of said telephone cradle.

3. Telephone apparatus in accordance with claim 2, wherein said adjustable shaft is provided with axially directed ends.

4. Telephone apparatus in accordance with claim 3, wherein said pivotal support means includes pad members located between the ends of said adjustable length shaft and the inside surfaces of the opposed sides of said handset cradle of the telephone.

5. Telephone apparatus in accordance with claim 4 wherein said pads are provided with an adhesive surface for engaging said handset cradle sides.

6. Telephone apparatus for use with a telephone having a handset and a handset cradle, said handset comprising projection structure which positions said handset, said telephone apparatus comprising:
   operable means for selectively depressing or releasing at least one disconnect switch button of said telephone which includes a member pivotally mounted on said projection structure of said telephone handset cradle, said member providing a predetermined force sufficient to depress one of said disconnect switch buttons, said member being adjustable to a first position to engage said one disconnect switch button of said telephone thereby depressing the same and adjustable to a second position to release said one disconnect switch button.

7. The apparatus of claim 6 wherein said telephone includes a telephone cradle and wherein said member is provided with pivotal support means, said pivotal support means including a longitudinally adjustable shaft mounted between the inside surfaces of opposed sides of said cradle.

8. The apparatus of claim 6 wherein said member is provided with pivotal support means, said pivotal support means including an adjustable element.

9. The apparatus of claim 6 wherein said telephone includes a telephone cradle and wherein said member is provided with pivotal support means, said pivotal support means including a shaft extending at least between opposed sides of said cradle.

10. The apparatus of claim 6 wherein said telephone includes a telephone cradle and wherein said member is provided with pivotal support means, said pivotal support means including an adjustable element between opposed sides of said cradle.

11. Telephone apparatus for enabling use of a telephone having a handset positionable upon disconnect switch buttons between projection structure of a telephone cradle, said handset to be used with an auxilliary device, said projection structure providing opposing members to position said handset, said telephone apparatus comprising:

operable means for selectively depressing or releasing at least one disconnect switch button in the telephone cradle, said operable means including a member pivotally mounted on said projection structure of said telephone cradle, said member providing a predetermined force sufficient to depress said at least one disconnect switch button, said member being adjustable to a first position to engage said at least one disconnect switch button of said telephone thereby depressing the same and adjustable to a second position to release said at least one disconnect switch button whereby said handset of said telephone may be continuously located with said auxilliary device at a position remote from the telephone handset cradle.

12. The telephone apparatus of claim 11 wherein said auxilliary device is an acoustic coupler.

* * * * *